(12) United States Patent
Muirhead et al.

(10) Patent No.: US 11,670,177 B2
(45) Date of Patent: *Jun. 6, 2023

(54) UNMANNED AERIAL VEHICLE REMOTE IDENTIFICATION, COMMAND AND CONTROL

(71) Applicant: Verizon Patent and Licensing Inc., Basking Ridge, NJ (US)

(72) Inventors: Jared Nelson Muirhead, Portland, OR (US); Matthew Fanelli, Washington, DC (US); Dana Maher, Portland, OR (US); Eric T. Ringer, Portland, OR (US); Michael David Bergeron, Amsterdam (NL)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 134 days.

This patent is subject to a terminal disclaimer.

(21) Appl. No.: 17/372,762

(22) Filed: Jul. 12, 2021

(65) Prior Publication Data

US 2021/0390864 A1  Dec. 16, 2021

Related U.S. Application Data

(63) Continuation of application No. 16/902,296, filed on Jun. 16, 2020, now Pat. No. 11,094,203.

(51) Int. Cl.
*G08G 5/00* (2006.01)
*B64C 39/02* (2023.01)
*H04W 4/44* (2018.01)

(52) U.S. Cl.
CPC ......... *G08G 5/0013* (2013.01); *B64C 39/024* (2013.01); *G08G 5/0069* (2013.01); *H04W 4/44* (2018.02); *B64U 2201/20* (2023.01)

(58) Field of Classification Search
CPC ..... G08G 5/0013; G08G 5/0069; H04W 4/44; B64C 39/024
USPC .......................................................... 340/933
See application file for complete search history.

(56) References Cited

U.S. PATENT DOCUMENTS

| 10,073,449 | B1 * | 9/2018 | Sait .................... H04L 67/06 |
| 10,291,764 | B2 * | 5/2019 | Dowlatkhah ......... H04W 12/08 |
| 11,094,203 | B1 * | 8/2021 | Muirhead ............... H04W 4/44 |
| 2014/0018976 | A1 * | 1/2014 | Goossen ............. G05D 1/0022 |
| | | | 701/2 |
| 2015/0302858 | A1 * | 10/2015 | Hearing ................. G10L 25/51 |
| | | | 381/58 |

(Continued)

OTHER PUBLICATIONS

"Remote Identification of Unmanned Aircraft Systems", Regulations.gov: Dec. 31, 2019, 126 pages.

*Primary Examiner* — Kerri L McNally

(57) ABSTRACT

A method may include receiving an identifier (ID) from a first unmanned aerial vehicle (UAV) prior to a flight, storing the ID and receiving telemetry information from the first UAV during the flight. The method may also include storing the telemetry information, receiving a request from a user device for information associated with a first location and authenticating the user device. The method may further include determining whether at least one UAV is flying in an area associated with the first location and transmitting telemetry information associated with the at least one UAV, in response to determining that at least one UAV is flying in the area associated with the first location.

20 Claims, 8 Drawing Sheets

(56) References Cited

U.S. PATENT DOCUMENTS

| | | | |
|---|---|---|---|
| 2015/0336667 A1* | 11/2015 | Srivastava | G05D 1/101 701/2 |
| 2016/0117931 A1* | 4/2016 | Chan | G08G 5/0039 701/120 |
| 2016/0125740 A1* | 5/2016 | Pasko | G08G 5/0034 701/528 |
| 2018/0359021 A1* | 12/2018 | Westrup | H04B 7/18506 |

* cited by examiner

UNMANNED AERIAL VEHICLE REMOTE IDENTIFICATION, COMMAND AND CONTROL

RELATED APPLICATION

This patent application is a continuation of U.S. patent application Ser. No. 16/902,296 filed on Jun. 16, 2020, titled "Unmanned Aerial Vehicle Remote Identification, Command and Control," the disclosure of which is hereby incorporated by reference herein in its entirety.

BACKGROUND INFORMATION

The Federal Aviation Administration (FAA) has proposed a rule that would establish requirements for the remote identification of Unmanned Aerial Vehicles (UAVs), also referred to as drones, that are operating within the airspace of the United States. The proposed rule would require a UAV to provide an identifier (ID) to an unmanned aircraft system (UAS) service supplier (USS) prior to a flight and in real-time during the flight. Implementing remote identification may be difficult for UAVs and UAV operators.

DETAILED DESCRIPTION OF EXAMPLE EMBODIMENTS

The following detailed description refers to the accompanying drawings. The same reference numbers in different drawings may identify the same or similar elements.

Implementing the proposed FAA rule regarding remote IDs and providing an ID in real-time may be difficult for many drones and drone operators. In addition, providing the ID to a USS that is certified to receive the ID and ensuring that the ID has been properly received may require coordination with a number of separate entities, such as the operator of the drone, a telecommunications network service provider via which the ID and telemetry information will be transmitted, the USS which will receive the ID and track the flight, etc.

Implementations described herein provide systems and methods for UAVs to provide identification information as well as telemetry information during a flight. The identification and telemetry information may then be made available to third parties (e.g., parties that may be flying or planning to fly a UAV in a particular area). Implementations described herein may also allow an operator (also referred to as user) to remotely control a UAV, such as send flight commands via a network and receive telemetry information associated with the flight of the UAV. In this manner, an integrated system described herein may provide UAV ID and telemetry information to third parties, as well as allow a UAV operator to remotely control a UAV. This may allow UAVs to fly in densely populated airspaces, while also helping to avoid mid-air collisions.

Figure 1:
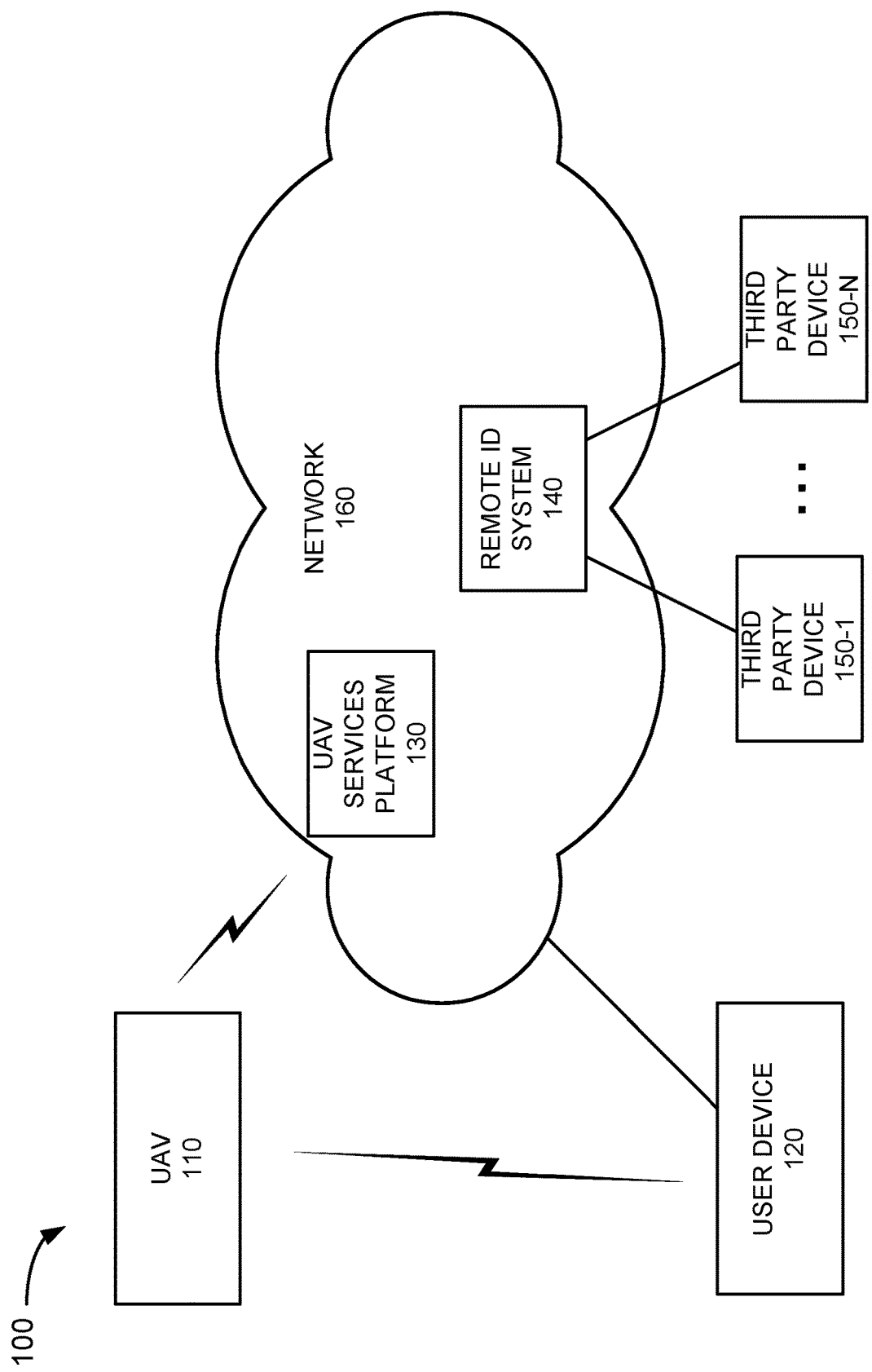
FIG. 1 illustrates an exemplary environment in which systems and methods described herein may be implemented.

FIG. 1 is a diagram illustrating an exemplary environment 100 in which systems and methods described herein may be implemented. Referring to FIG. 1, environment 100 includes UAV 110 (also referred to herein as drone 110), user device 120, UAV services platform/system 130, remote ID system 140, third party devices 150 to 150-N and network 160.

UAV 110 may include an aircraft (e.g., a single rotor aircraft, multirotor aircraft or fixed wing aircraft) that receives control signals from a controller, such as user device 120. In implementations described herein, UAV 110 may receive signals from a transmitter associated with the controller to control the flight of UAV 110. For example, the altitude of UAV 110 may be changed via signals from user device 120 to maneuver UAV 110 based on the particular flight goals. In some implementations, UAV 110 may include cellular communication capability (e.g., fourth generation long term evolution (4G LTE) communication capability, fifth generation (5G) communication capability, etc.) to allow UAV 110 to receive commands from a remotely located user device 120 and/or a short range wireless communication capability (e.g., WiFi) to allow UAV 110 to receive commands from user device 120 located relatively close to UAV 110, as described in detail below.

User device 120 may include a controller to control operation of UAV 110. For example, user device 120 may include a user interface to allow a user to control the flight pattern of UAV 110, receive information from various sensors on UAV 110, operate a camera on UAV 110, read information from various sensors on UAV 110, etc. In some implementations, user device 120 may be located in relatively close proximity to UAV 110 and control operation of UAV 110 wirelessly via a short range connection (e.g., WiFi). In other implementations, user device 120 may be located remotely with respect to UAV 110. In this implementation, user device 120 may include any computer device used to transmit information to UAV 110 (e.g., commands) and receive data from UAV 110 (e.g., telemetry information) via, for example, UAV services platform 130 over network 160. For example, user device 120 may include a mobile phone, laptop computer, tablet computer, desktop computer, wearable computer (e.g., eyeglasses or wristwatch), etc., that includes communication functionality and is able to provide, for example, commands to UAV 110 via network 160 and receive telemetry information from UAV 110 via network 160, as described in detail below.

UAV services platform 130 may include one or more computing devices configured to interface with UAV 110 and user device 120 to provide various services to UAV 110 and UAV operators. For example, UAV services platform 130 may act as an unmanned aircraft system service supplier (USS) that is able to receive an identifier (ID) from UAV 110 and/or from user device 120 prior to a flight and provide the ID and telemetry information for UAV 110 to third party devices 150. For example, UAV services platform 130 may store the IDs locally and/or transmit the UAV IDs to an external database, such as a database at remote ID system 140, as described in more detail below. UAV services platform 130 may also provide an interface for receiving commands from user device 120 to control the operation of UAV 110, as well as provide telemetry data associated with the UAV 110 to user device 120, as described in more detail below.

Remote ID system 140 may include one or more computing devices configured to store and provide access to remote IDs associated with UAVs 110. Remote ID system 140 may also act as an authorized USS that is able to receive UAV identifiers and provide information regarding UAVs 110 to third party devices 150. For example, remote ID system 140 may include a database that stores UAV IDs, along with flight paths and other telemetry information regarding the UAVs associated with the particular IDs. Remote ID system 140 may also include an application programming interface (API) that allows third party devices 150 to access the remote ID information and telemetry information associated with UAVs 110, as described in more detail below.

Third party devices 150 may each include any type of computing device, such as a mobile telephone, laptop computer, tablet computer, desk top computer, etc., that includes communication functionality. Third party devices 150 may interface with remote ID system 140 (e.g., via a remote ID API) and obtain information regarding UAVs 110 flying in a particular air space. For example, a third party device 150 associated with a UAV operator flying or planning to fly UAV 110 in a particular area may access remote ID system 140 to allow the UAV operator to be aware of other UAVs flying in the same airspace as the operator's UAV.

Network 160 may include one or more wired, wireless and/or optical networks that are capable of receiving and transmitting data, voice and/or video signals. For example, network 160 may include one or more public switched telephone networks (PSTNs) or other type of switched network. Network 160 may also include one or more wireless networks and may include a number of wireless stations for receiving wireless signals and forwarding the wireless signals toward the intended destinations. Network 160 may further include one or more satellite networks, one or more packet switched networks, such as an Internet protocol (IP) based network, a software defined network (SDN), a local area network (LAN), a personal area network (PAN), a WiFi network, a Bluetooth network, a wide area network (WAN), a long term evolution (LTE) network, a fourth generation (4G) network, a 4G LTE Advanced network, a fifth generation (5G) network, an intranet, the Internet, or another type of network that is capable of transmitting data. Network 160 may provide packet-switched services and wireless Internet protocol (IP) connectivity to various components in environment 100, such as UAV 110, user device 120 and third party devices 150, to provide, for example, data, voice, and/or multimedia services.

The exemplary configuration illustrated in FIG. 1 is provided for clarity. It should be understood that a typical environment may include more or fewer devices than illustrated in FIG. 1. For example, environment 100 may include a large number (e.g., hundreds or more) of UAVs 110, user devices 120 and third party devices 150, as well as multiple UAV services platform 130 and remote ID systems 140. As an example, environment 100 may include UAV services platforms 130 and remote ID systems 140 geographically distributed across a large service area (e.g., nationwide). Environment 100 (e.g., network 160) may also include elements, such as evolved NodeBs (eNodeBs), next generation NodeBs (gNodeBs), base stations, switches, gateways, routers, monitoring devices, etc. (not shown), that aid in routing data in environment 100.

Various operations are described below as being performed by particular components in environment 100. In other implementations, various operations described as being performed by one device may be performed by another device or multiple other devices, and/or various operations described as being performed by multiple devices may be combined and performed by a single device. For example, in some implementations, UAV services platform 130 and remote ID system 140 may be integrated into a single system/platform.

Figure 2:
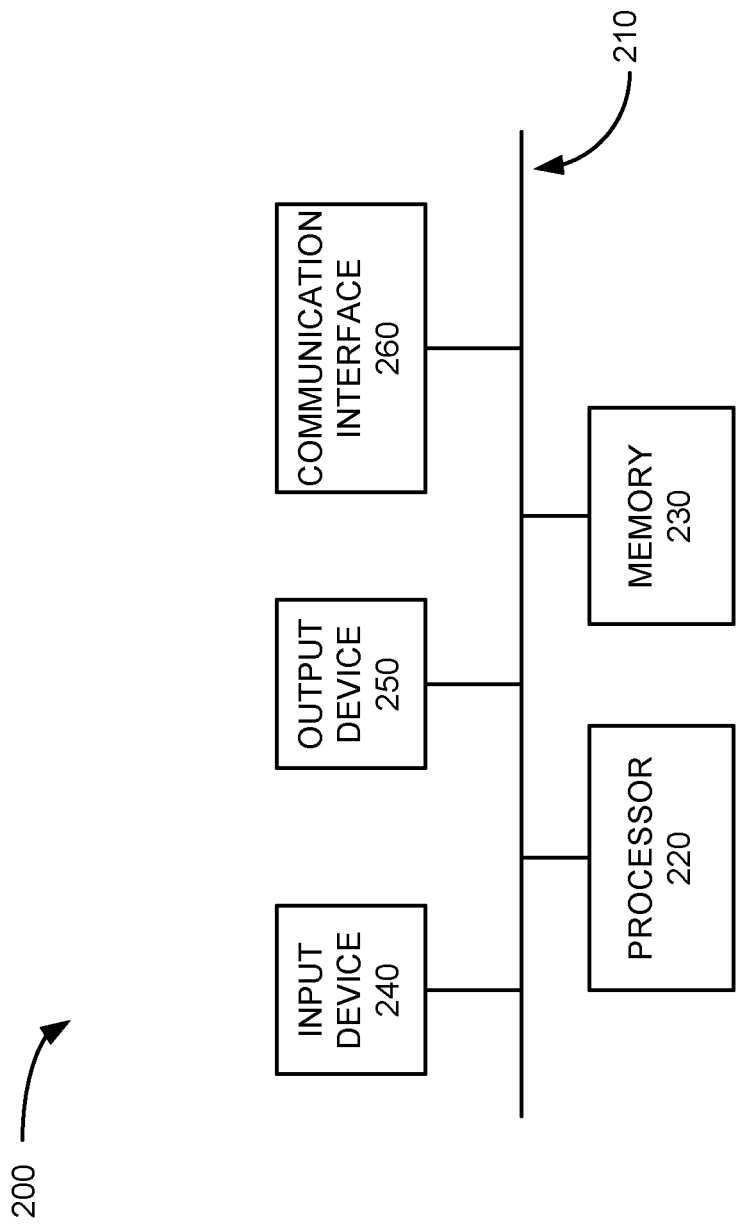
FIG. 2 is a block diagram of components implemented in one or more of the elements of the environment of FIG. 1 in accordance with an exemplary implementation.

FIG. 2 illustrates an exemplary configuration of a device 200. One or more devices 200 may correspond to or be included in UAV 110, user device 120, UAV services platform 130, remote ID system 140 and third party devices 150. Referring to FIG. 2, device 200 may include bus 210, processor 220, memory 230, input device 240, output device 250 and communication interface 260. Bus 210 may include a path that permits communication among the elements of device 200.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SSD). Memory 230 may also include a magnetic and/or optical recording medium (e.g., a hard disk) and its corresponding drive.

Input device 240 may include a mechanism that permits a user to input information, such as a keypad, a keyboard, a mouse, a pen, a microphone, a touch screen, voice recognition and/or biometric mechanisms, etc. Output device 250 may include a mechanism that outputs information to the user, including a display (e.g., a liquid crystal display (LCD)), a speaker, etc. In some implementations, device 200 may include a touch screen display may act as both an input device 240 and an output device 250.

Communication interface 260 may include one or more transceivers that device 200 uses to communicate with other devices via wired, wireless or optical mechanisms. For example, communication interface 260 may include one or more radio frequency (RF) transmitters, receivers and/or transceivers and one or more antennas for transmitting and receiving RF data. Communication interface 260 may also include a modem or an Ethernet interface to a LAN or other mechanisms for communicating with elements in a network.

The exemplary configuration illustrated in FIG. 2 is provided for clarity. It should be understood that device 200 may include more or fewer components than illustrated in FIG. 2. For example, for device 200 implemented in UAV 110, device 200 may include a positioning system/satellite navigation system, such as a global positioning system (GPS) component, which may provide position information in relation to a standard reference frame, sensors and control circuitry to control and/or monitor the flight of UAV 110, as well as a battery to power UAV 110.

In an exemplary implementation, device 200 performs operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), SSD, etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3:
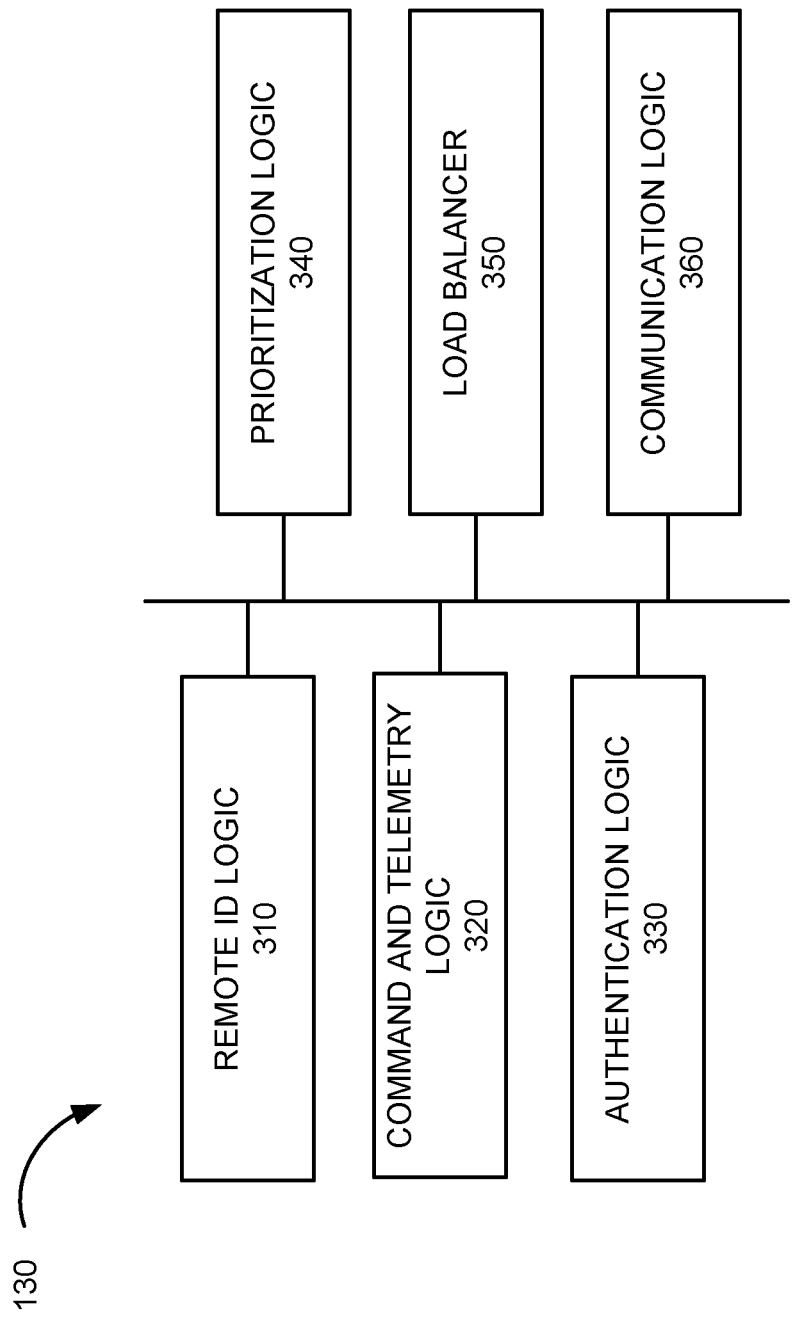
FIG. 3 illustrates exemplary logic components implemented in the UAV services platform of FIG. 1 in accordance with an exemplary implementation.

FIG. 3 is a block diagram of components implemented in UAV services platform 130 of FIG. 1 in accordance with an exemplary implementation. Referring to FIG. 3, UAV services platform 130 may include remote ID logic 310, command and telemetry logic 320, authentication logic 330, prioritization logic 340, load balancer 350 and communication logic 360. These elements may be implemented by processor 220 executing instructions stored in memory 230 of UAV services platform 130. In alternative implementations, these components or a portion of these components may be located externally with respect to UAV services platform 130.

Remote ID logic 310 may include logic to receive an ID from UAVs, such as UAV 110. For example, UAV 110 may transmit its ID to UAV services platform 130 prior to a flight and during a flight to allow UAV services platform 130 to track UAV 110. UAV services platform 130 may receive the ID and remote ID logic 310 may forward the remote ID to remote ID system 140. In some implementations, remote ID logic 310 may receive IDs from various UAVs 110 in a number of different formats. In such implementations, remote ID logic 310 may reformat the received ID from UAV 110 into a format usable by, for example, third party devices 150, as described in detail below. Remote ID logic 310 may also remove sensitive information associated with the UAV ID, such as manufacturer-specific information, operator-specific information, etc. That is, in some implementations, remote ID logic 310 may anonymize the ID information prior to storing the ID.

Command and telemetry logic 320 may include logic to receive commands from user device 120 for controlling UAV 110 and send the commands to UAV 110. Command and telemetry logic 320 may also receive telemetry information from UAV 110 to track the flight of UAV 110 and forward the telemetry information to, for example, user device 120 and remote ID system 140. The term "telemetry information or data" as used herein should be construed to include one or more parameters associated with the flight of a UAV 110, such as the location of UAV 110 (e.g., latitude and longitude), elevation above sea level, UAV 110 speed, heading, wind direction and speed, etc.

Authentication logic 330 may include logic to ensure that an operator at user device 120 is permitted to control user device 120 and/or receive telemetry information from UAV 110. In an exemplary implementation, authentication logic 330 may use a login and password to initially determine the identity of a user at user device 120, followed by a second item to authenticate the user. For example, authentication logic 330 may implement a 2-factor authentication in which the operator at user device 120 registers a second device with UAV services platform 130. Authentication logic 330 will transmit an authentication code to the registered second device and the authentication code must be transmitted back to UAV services platform 130 to complete the authentication of the user/user device 120. In some implementations, authentication logic 330 may also determine whether UAV 110 and/or operator device 120 are not malicious devices attempting to hack into UAV services platform 130. For example, authentication logic 330 may access a database storing address information associated with malicious devices to ensure that UAV 110 and/or operator device 120 are not malicious devices. Other authentication schemes using, for example, cryptographic certificates, secure elements or trusted computing modules may also be used. For example, in some implementations, Public Key Infrastructure (PKI) may be used to allow user device 120 and/or UAVs 110 to authenticate with UAV services platform 130 without requiring any human input.

Prioritization logic 340 may include logic to prioritize the transmission of data to/from UAV 110. For example, in one implementation, prioritization logic 340 prioritizes commands to be sent to UAV 110 over telemetry data being sent to user device 120. For example, UAV services platform 130 may support Differentiated Services Code Point (DSCP)/type of service (TOS) bit patterns associated with received requests/data to determine the priority of data being sent to/from UAV 110. In this manner, high priority messages, such as UAV flight control commands may be sent to UAV 110 before lower priority messages to minimize the chance of loss of high priority messages during times when a radio link may be congested or saturated, as well as to ensure quality of service.

Load balancer 350 may include logic to balance and scale the use of resources in UAV services platform 130. For example, load balancer 350 may redirect some requests to achieve scaling/load balancing based on, for example, types of operations, an operator or organization associated with the request, a location geohash, etc., to maintain defined quality of service for particular users.

Communication logic 360 may include logic for communicating with devices in environment 100. For example, communication logic 360 may receive data from UAV 110 and user device 120 and forward data to UAV 110, user device 120 and/or remote ID system 140. Communication logic 360 may also communicate with wireless stations, routers and other devices in network 160 (not shown). In an exemplary implementation, communication logic 360 may communicate with other devices in environment 100, such as UAV 110 and user device 120 via user datagram protocol (UDP), such as using the constrained application protocol (CoAP). Using UDP (e.g., CoAP) to transmit telemetry and commands may reduce effects of aerial connectivity with respect to communicating with UAV 110. Using UDP may also provide for a more efficient use of resources in environment 100, as opposed to, for example, using transmission control protocol (TCP). For example, TCP may require multiple retries, timeouts and connection restarts when a connection is lost. By using UDP, multiple retries may be avoided since environment 100 may not require that all of the data (e.g., each transmission of real-time telemetry data) be received from UAV 110.

Although FIG. 3 shows exemplary components of UAV services platform 130, in other implementations, UAV services platform 130 may include fewer components, different components, differently arranged components, or additional components than depicted in FIG. 3.

Figure 4:
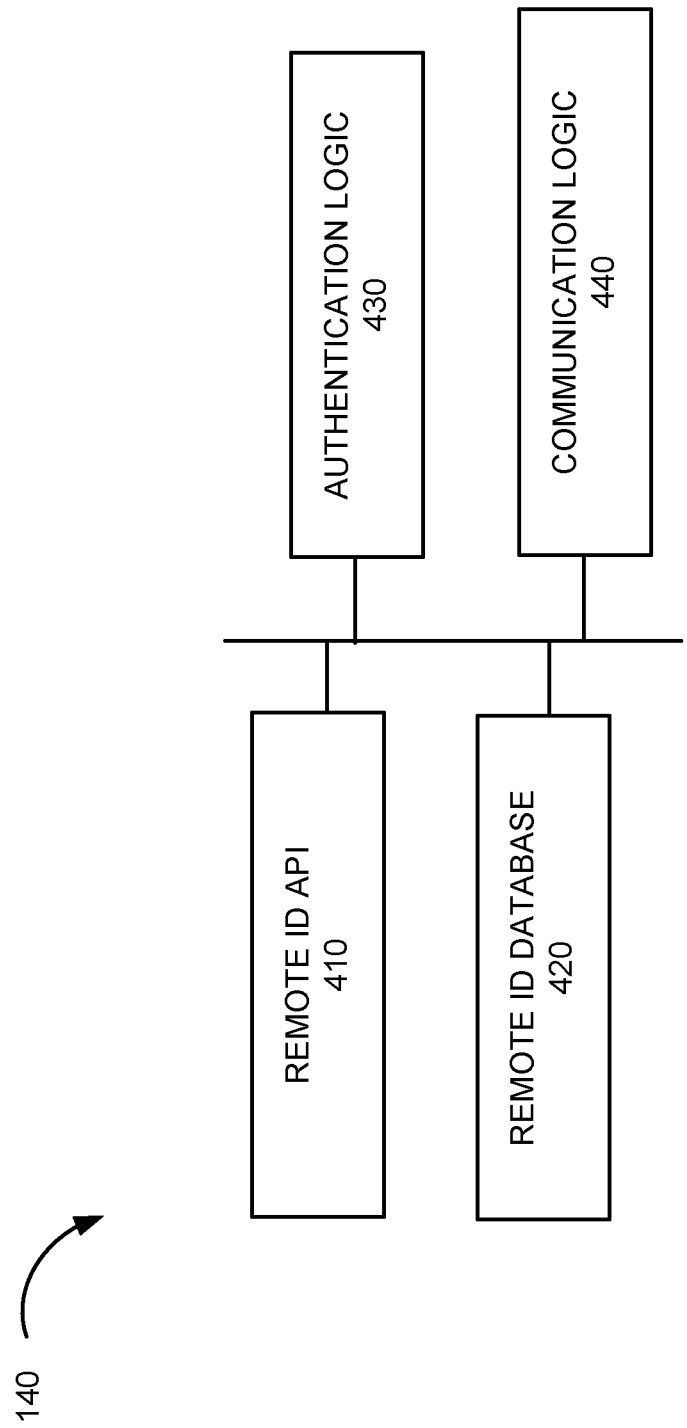
FIG. 4 is a block diagram illustrating logic components implemented in the remote ID system of FIG. 1 in accordance with an exemplary implementation.

FIG. 4 illustrates an exemplary configuration of remote ID system 140. Referring to FIG. 4, remote ID system 140 includes remote ID API 410, remote ID database 420, authentication logic 430 and communication logic 440.

Remote ID API 410 may include an application programming interface to allow third party devices 150 to access information regarding UAVs flying in a particular area. For example, a third party device 150 may access remote ID system 140 via remote ID API 410 and inquire as to UAVs flying in a particular area. In response, remote ID API 410 may access remote ID database 420 and provide information (e.g., IDs) of UAVs 110 flying in the particular area, as well as telemetry information identifying the particular locations and/or flight paths of the UAVs 110. Remote ID API 410 may also allow third party devices 150 to provide a query regarding UAVs in a particular area and at a particular time. For example, third party device 150-1 may inquire as to UAVs that will be flying in a particular area at 1:30 PM on a particular date. In response, remote ID system 140 may provide the information to third party device 150 regarding UAVs at the requested time.

Remote ID database 420 may store remote IDs and information associated with the corresponding UAVs. For example, as discussed previously, UAV services platform 130 may receive IDs from UAVs 110 and may forward the IDs to remote ID system 140. Remote ID system 410 may store the remote IDs in remote ID database 420. UAV services platform 130 may also receive telemetry information (e.g., latitude, longitude, elevation, heading, etc.) in real-time or near real-time from UAVs 110 and forward this information to remote ID system 140. Remote ID system 140 may also store the telemetry information (e.g., geographic coordinates) and time information associated with the particular locations in remote ID database 420.

Authentication logic 430 may include logic to ensure that a party at third party device 150 is permitted to access remote ID information. In an exemplary implementation, authentication logic 430 may use a 2-factor authentication similar to authentication logic 330 described above. For example, authentication logic 430 may require a login and password to determine if third party device 150 is registered with remote ID system 140, followed by transmitting an authentication code to another device registered by third party device 150. The authentication code may then be transmitted to remote ID system 140 to authenticate the user. In this manner, authentication logic 430 can ensure that malicious users are not trying to hack remote ID system 140.

Communication logic 440 may include logic for communicating with devices in environment 100. For example, communication logic 440 may communicate with UAV services platform 130, third party devices 150, user devices 120, etc. Communication logic 440 may also communicate with wireless stations, routers and other devices (not shown) in network 160.

Although FIG. 4 shows exemplary components of remote ID system 140, in other implementations, remote ID system 140 may include fewer components, different components, differently arranged components, or additional components than depicted in FIG. 4.

Figure 5:
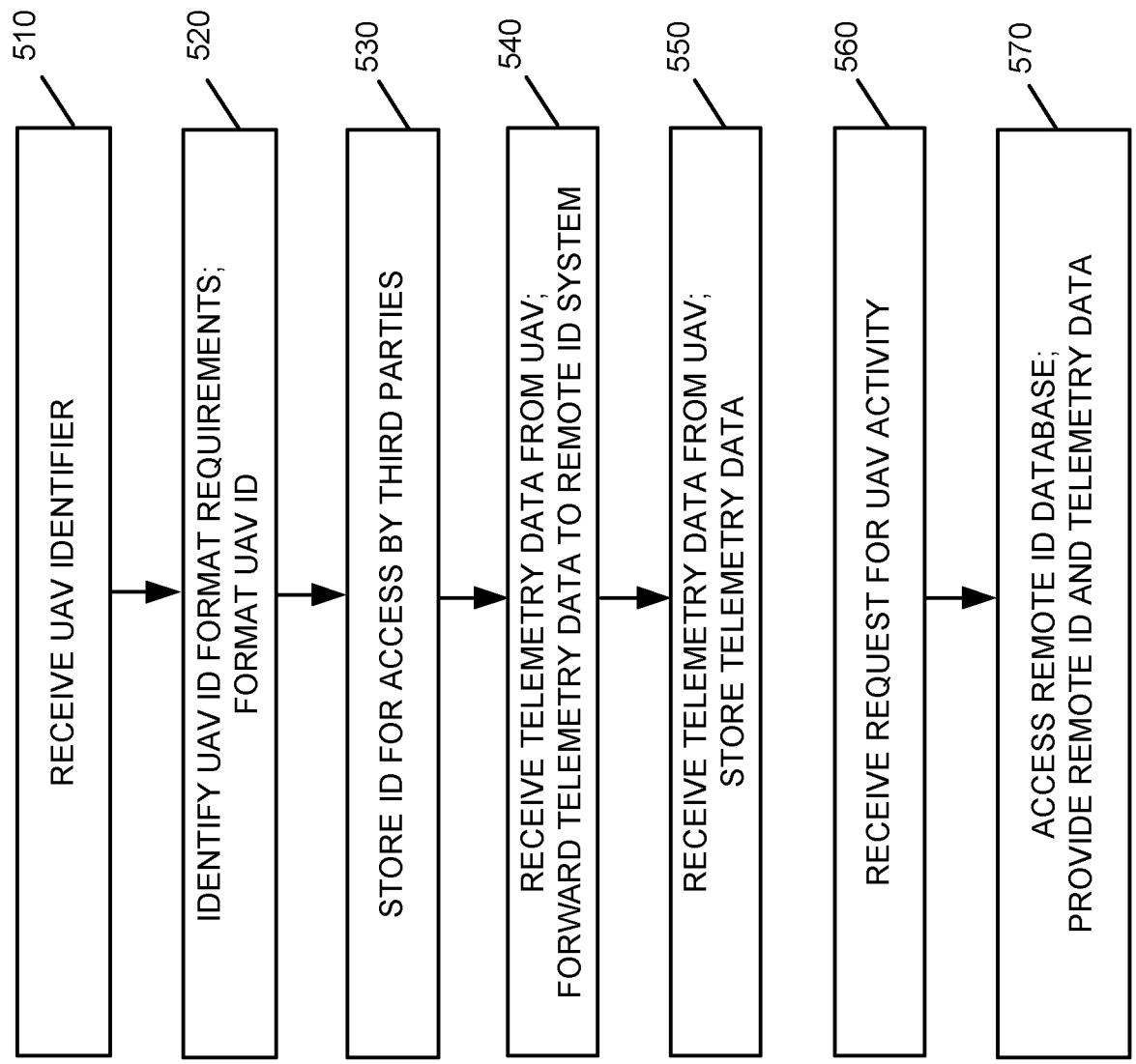
FIG. 5 is a flow diagram illustrating processing associated with operation of the remote ID system of FIG. 1 in accordance with an exemplary implementation.
Figure 6:
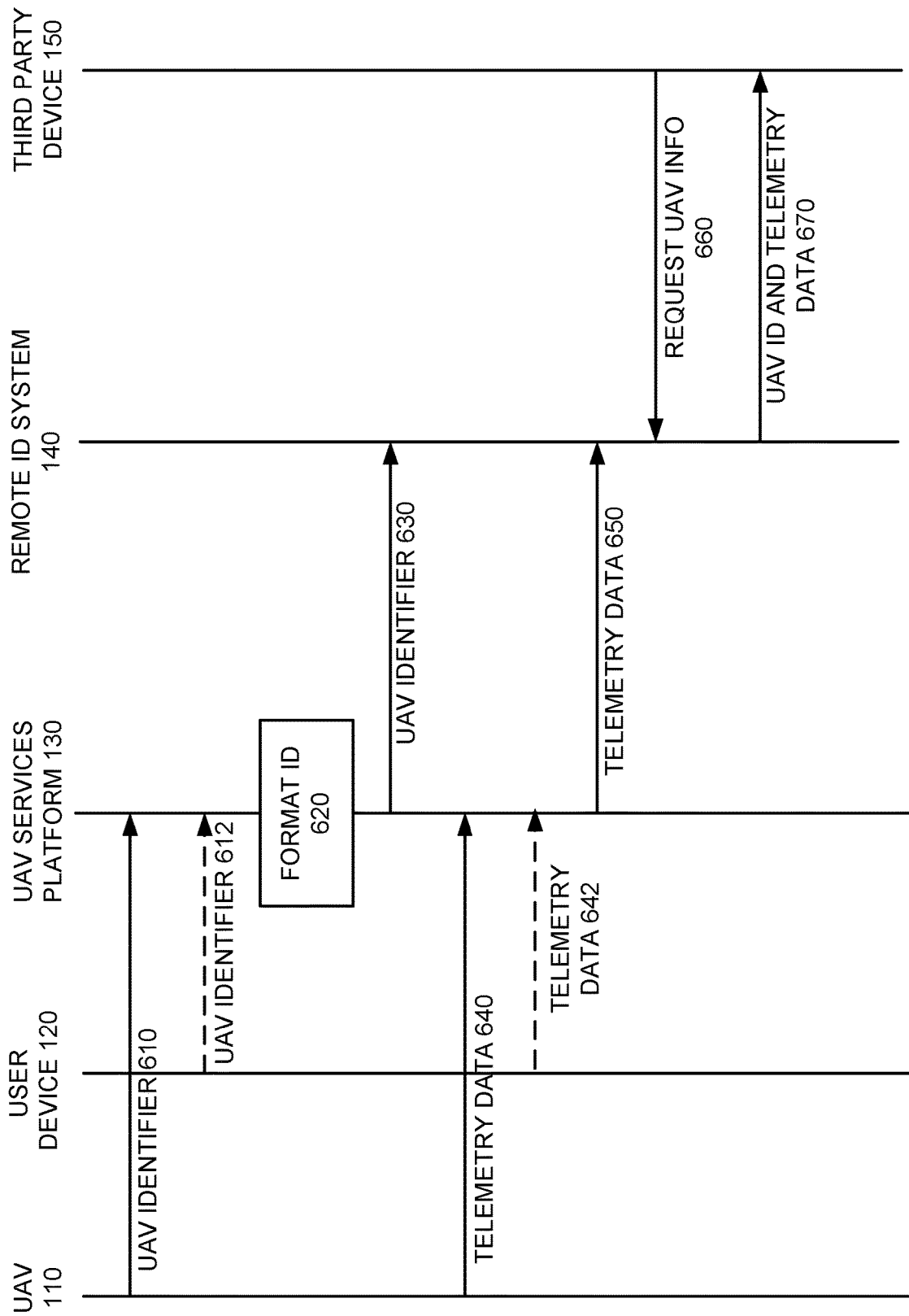
FIG. 6 is an exemplary signal flow diagram associated with the processing of FIG. 5.

FIG. 5 is a flow diagram illustrating processing associated with operation of remote ID system 140 in accordance with an exemplary implementation and FIG. 6 is an exemplary signal flow diagram associated with the processing of FIG. 5. Processing may begin with an operator associated with UAV 110 preparing UAV 110 for a flight. As part of the pre-flight process, UAV 110 may transmit an identifier (ID) associated with UAV 110 to UAV services platform 130 (FIG. 6, 610). For example, UAV 110 may include cellular communication capability (e.g., 4G LTE, 5G, etc.) to allow UAV 110 to transmit information to a wireless station (e.g., eNodeB, gNodeB, etc.) in network 160. In alternative implementations, UAV 110 may have a short range wireless communication capability (e.g., WiFi). In such cases, user device 120 may transmit the ID associated with UAV 110 to UAV services platform 130 (FIG. 6, 612). In either case, remote ID logic 310 receives the UAV ID (block 510). In an exemplary implementation, the UAV ID may include a serial number of the UAV that is issued by the UAV manufacturer and meets serial number standards (e.g., American National Standards Institute (ANSI) standards) and/or meets government requirements (e.g., FAA requirements) associated with UAVs. The UAV ID may also include a manufacturer and model of the UAV. In other implementations, the UAV ID may include other information used to uniquely identify the UAV, such as a media access control (MAC) address or ID associated with the UAV.

In an exemplary implementation, remote ID logic 310 may determine the format requirements associated with storing IDs for UAVs 110 that may then be retrieved by, for example, third party devices 150 (block 520). For example, a regulating agency, such as the FAA, may provide format requirements (e.g., numbering and/or nomenclature for the UAV ID, additional information to be provided with the UAV ID, such as an entity operating the UAV, etc.). Remote ID logic 310 may reformat the ID, if necessary, in accordance with the FAA requirements (block 520; FIG. 6, 620). In addition, different UAVs 110 associated with different manufacturers may provide different information and/or formats associated with their respective identifiers. As a result, remote ID logic 310 may reformat the received UAV ID information in accordance with the FAA requirements to provide a standardized format for all UAVs 110. In some implementations, remote ID logic 310 may anonymize the UAV ID to ensure that no private or sensitive information is made available to third party devices 150.

Remote ID logic 310 may also forward the formatted IDs for storage in a database accessible by third party devices 150. For example, in one implementation, remote ID logic 310 may forward the remote ID to another system, such as remote ID system 140, via communication logic 360 over network 160 (FIG. 6, 630). Remote ID system 140 may receive the UAV ID information and store the ID in remote ID database 420 (block 530).

UAV services platform 130 may also receive telemetry data from UAV 110 in real-time or near real-time while UAV 110 is in flight (block 540). For example, UAV 110 may transmit telemetry information (e.g., latitude, longitude, elevation, heading, etc.) in real-time or near real-time to UAV services platform 130 while UAV 110 is in flight (FIG. 6, 640). As described above, in some implementations, UAV 110 may include a cellular communication capability to allow UAV 110 to transmit the telemetry information to UAV services platform 130 via network 160 (e.g., via an eNodeB, gNodeB, etc.). In alternative implementations, UAV 110 may forward telemetry information associated with the flight of UAV 110 to user device 120, which forwards the telemetry information to UAV services platform 130 (FIG. 6, 642). In either case, UAV services platform 130 may forward the telemetry information to remote ID system 140 (block 540; FIG. 6, 650). Remote ID system 140 receives the telemetry information and stores the telemetry information in remote ID database 420 (block 550). UAV services platform 130 and remote ID system 140 may receive and store UAV ID and telemetry information in this manner for a large number of UAVs 110 (e.g., thousands or more).

In other implementations, telemetry information received by UAV services platform 130 is stored at UAV services platform 130. In such implementation, remote ID system 140 may periodically request the telemetry information from UAV services platform 130 and/or request the telemetry information when remote ID system 140 receives a request from third party device 150. In still other implementations, UAV services platform 130 may periodically send a subset of the telemetry information to remote ID system 140 to allow third party devices 150 to identify UAVs in particular geographic areas. In each case, UAV services platform 130 may reformat the remote ID, if necessary, to ensure that the remote ID is in the proper format. Further, in some implementations, UAV services platform 130 may store other information associated with UAVs 110, including flight plan information, such as predicted space/time coordinates, sensor data from UAV 110 (e.g., weather-related data), video images from UAV 110, etc.

Assume that third party device 150-1 is associated with an entity that operates a number of UAVs. Further assume that the entity associated with third party device 150-1 would like to access information associated with UAVs flying (or planning to fly) in a particular location or area. In this case, third party device 150-1 may access remote ID system 140 to request the UAV activity in the particular location/area (block 560; FIG. 6, 660). For example, third party device 150-1 may access remote ID system 140 and remote ID API 410 may provide a user interface, such as a graphical user interface (GUI), that allows the user at third party device 150 to input a particular location and/or geographic area, such as a city, area name (e.g., a subdivision, park, landmark, etc.), street name and/or street number, an intersection name, etc. In some implementations, the GUI may allow the user to input geographic coordinates (e.g., latitude and longitude coordinates) corresponding to the location of interest. The GUI may also allow the user to input a time and date with the request, such as a time at which the user at third party device 150-1 would like to obtain UAV activity information in the selected location/area.

Remote ID API 410 may receive the request, access remote ID database 420 and provide the remote ID information of UAVs 110 flying in the requested area, along with the telemetry data for UAVs flying in the requested location/area (block 570; FIG. 6, 670). For example, remote ID system 140 may identify the location/area associated with the request, along with a time associated with the request. Remote ID system 140 may also identify UAVs currently flying in a proximity to the identified location/area at the requested time, such as identify UAVs flying within a predetermined radius of the requested location/area, such as within a radius of 0.2 miles, 0.5 miles, 1 mile, 2 miles, etc., of the requested location/area. It should be understood that remote ID system 140 may identify a larger or smaller radius with respect to UAVs in the requested location/area based on the particular situation, such as the particular geographical location and the number of UAVs 110 in the geographic location. In this manner, the entity associated with third party device 150-1 may receive IDs and telemetry information regarding UAVs 110 flying in an area where the entity/operator plans to fly a UAV. This may help avoid mid-air collisions and other problems associated with flying UAVs in, for example, potentially congested airspace. In addition, allowing third party devices 150 with access to UAV ID and telemetry information may allow a regulating agency or law enforcement agency to easily identify UAVs 110 that are operating in an unsafe manner or outside of legal requirements (e.g., flying too close to power lines, flying in a restricted airspace, etc.).

In some implementations, remote ID system 140 may communicate with other remote ID systems 140 and/or UAV services platforms 130 to obtain information regarding UAVs flying in a particular area. For example, inter-remote ID systems 140 communications (e.g., inter-USS communications) may be used to allow remote ID system 140 to communicate with another USS that may store information regarding UAVs flying in the particular area of interest.

Figure 7:
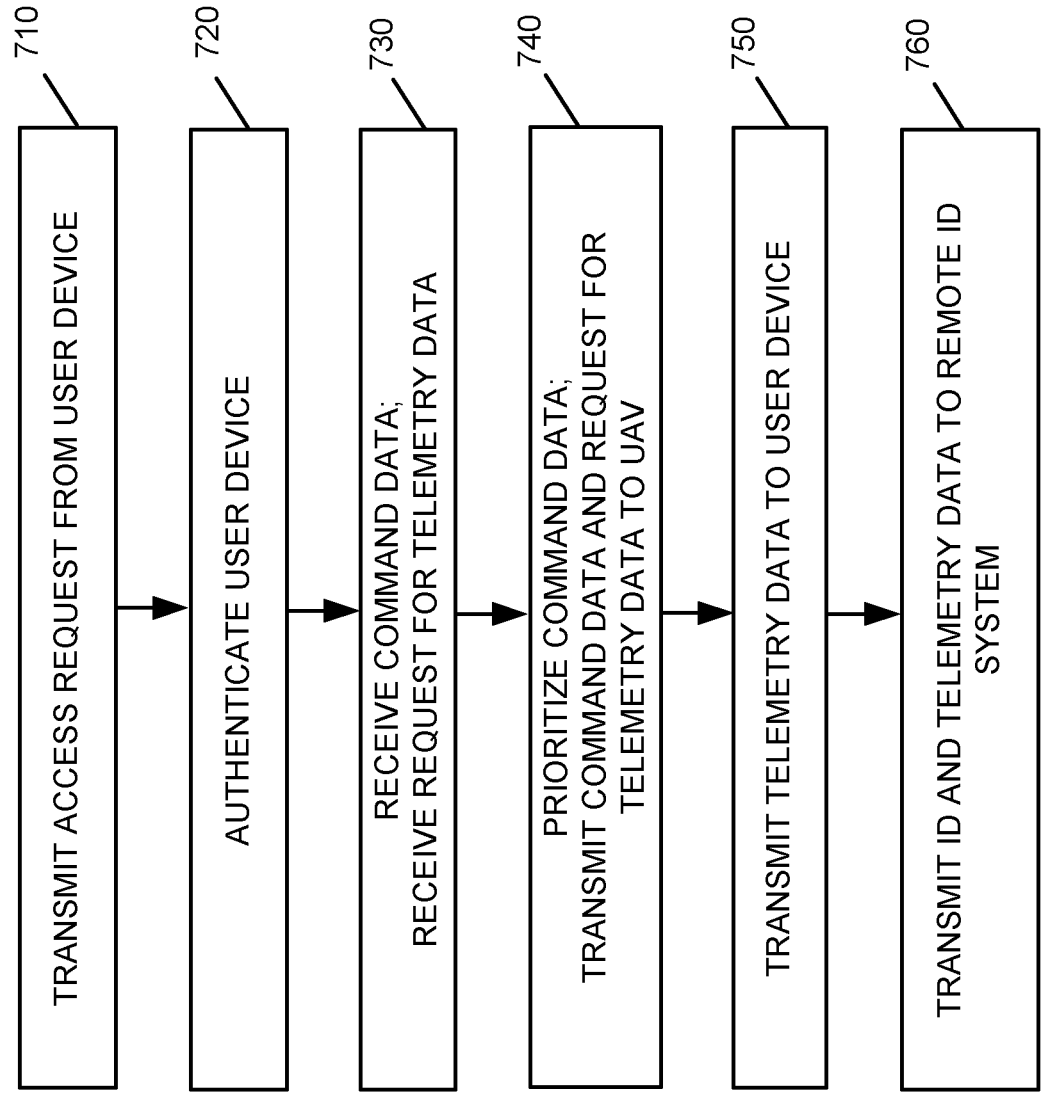
FIG. 7 is a flow diagram illustrating processing associated with operation of the UAV services platform of FIG. 1 in accordance with an exemplary implementation.
Figure 8:
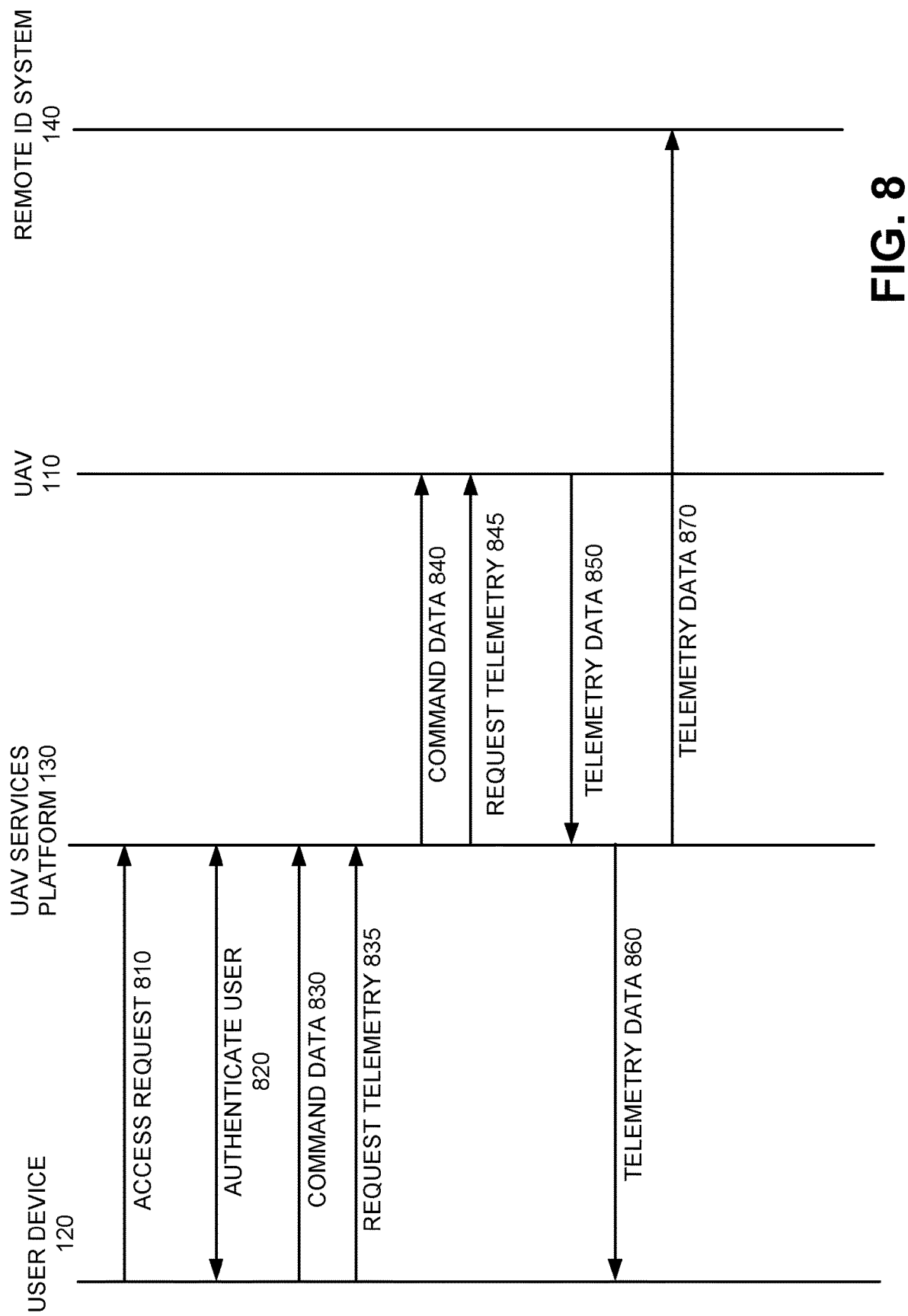
FIG. 8 is an exemplary signal flow diagram associated with the processing of FIG. 5.

As discussed above, in some implementations, UAV services platform 130 may support the provisioning of flight commands from user device 120 to UAV 110. FIG. 7 is a flow diagram illustrating exemplary processing associated with controlling UAV 110 remotely via UAV services platform 130 and FIG. 8 is a signal flow diagram illustrating exemplary signal flows associated with the processing of FIG. 7. Processing may begin with an operator at user device 120 accessing UAV services platform 130 to control the operation of UAV 110 (block 710; FIG. 8, 810). UAV services platform 130 receives the request and authenticates user device 120 (block 720; FIG. 8, 820). For example, authentication logic 330 may perform a 2-factor authentication for user device 120 to ensure that user device 120 is authorized to control UAV 110.

Assume that user device 120 is authenticated. User device 120 may transmit commands to control the operation of UAV (FIG. 8, 830). User device 120 may also transmit a request for telemetry data associated with UAV 110 (FIG. 8, 835). UAV services platform 130 may receive the command data and request for telemetry data (block 730). In an exemplary implementation, UAV services platform 130 may prioritize the transmission of the command data to UAV 110 over the transmission of telemetry data (block 740). For example, prioritization logic 340 may determine whether network 160 is congested based on, for example, a round trip delay time associated with data packets forwarded to UAV 110. If prioritization logic 340 determines that network 160 is congested, prioritization logic 330 may forward the command data to UAV 110 (FIG. 8, 840) and forward the request for telemetry data to UAV 110 at a later time (block 740; FIG. 8, 845). In each case, UAV services platform 130 transmits the command data to UAV 110 and transmits the request for telemetry data to UAV 110.

UAV 110 may receive the command data and perform operations corresponding to the command, such as change a heading for UAV 110, operate one or more rotors to achieve the desired flight path, elevation, etc. UAV 110 may also forward the telemetry data to UAV services platform 130, which then forwards the telemetry data to user device 120 (block 750; FIG. 8, 850, 860). UAV services platform 130 may also forward the telemetry data and UAV ID to remote ID system 140 (block 760; FIG. 8, 870). In this manner, remote ID system 140 may be able to provide data regarding UAV 110 to third party devices 150, as described above with respect to FIGS. 5 and 6.

Implementations described allow third parties to obtain information regarding the remote identification of UAVs flying in particular areas, as well as providing telemetry and/or flight path information to the third parties. Implementations described herein also allow an operator/user to remotely control a UAV over a network, as opposed to having to be located within a short range of the UAV. This may allow an operator to remotely control one or more UAVs, while also being aware of other UAVs flying in/near the same air space.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to UAV services platform 130 and remote ID system 140 being separate systems/platforms. In other implementations, UAV services platform 130 and remote ID system 140 may be part of the same platform/system.

In addition, features described above refer to remote ID system 140 storing UAV ID and flight telemetry information for allowing third parties to obtain information regarding UAVs currently flying in a particular area or flying in a particular area at a future time. In some implementations, the UAV ID and telemetry/flight path data for UAVs may be stored for a period of time to allow various entities/third parties to access flight path information long after a flight has occurred.

Further, in some implementations, the remote ID associated with a UAV 110 may be used for other purposes, such as providing direct access to UAV 110. For example, UAV services platform 130 may generate or return an Internet Protocol (IP) address (e.g., an IP version 4 (IPv4) address or an IP version 6 (IPv6) address based on the remote ID. The UAV 110 may then be directly addressed via the IP address for command and control. In addition, a local network may identify a UAV's RF transponder and use the transponder code with a lookup service to determine the UAV's IP address. UAV services platform 130 may then use the IP address to directly connect with the UAV.

Still further, while series of acts have been described with respect to FIGS. 5 and 7 and signal flows with respect to FIGS. 6 and 8, the order of the acts and/or signal flows may be different in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A system, comprising:
    at least one device comprising a processor, wherein the at least one device is configured to:
        receive a first identifier (ID) associated with a first unmanned aerial vehicle (UAV) prior to a flight,
        store the first ID,
        receive a second identifier from a first user device configured to control the first UAV,
        authenticate the first user device,
        receive a command from the first user device associated with controlling operation of the first UAV, and
        forward the command to the first UAV.

2. The system of claim 1, wherein the at least one device is configured to:
    receive, from the first user device, a request for telemetry data associated with the first UAV,
    prioritize command data over requests for telemetry data, and
    forward command data to the first UAV prior to forwarding the request for telemetry data.

3. The system of claim 1, wherein the at least one device is further configured to:
    transmit telemetry data associated with the flight of the first UAV to the first user device.

4. The system of claim 3, wherein when transmitting the telemetry data, the at least one device is configured to:
    provide a location, elevation and at least one of a heading or flight pattern for the first UAV.

5. The system of claim 3, wherein the at least one device comprises a UAV services platform and a remote ID system, wherein the UAV services platform is configured to:
    transmit the telemetry data associated with the flight of the first UAV to the remote ID system.

6. The system of claim 5, wherein the remote ID system is configured to:
    receive a request for telemetry data from a second user device, and
    provide telemetry data associated with at least one UAV to the second user device.

7. The system of claim 1, wherein the at least one device is further configured to transmit the command using user datagram protocol.

8. The system of claim 1, wherein the at least one device comprises a UAV services platform and a remote ID system, wherein the UAV services platform is configured to:
    receive the first ID from the first UAV and forward the first ID to the remote ID system.

9. The system of claim 1, wherein the at least one device is further configured to:
    receive telemetry information from the first UAV during the flight,
    store the telemetry information,
    receive a request from a second user device for information associated with a first location,
    determine that the second user device is authorized to receive information from the at least one device,
    determine whether at least one UAV is flying in an area associated with the first location, and
    transmit telemetry information associated with the at least one UAV, in response to determining that at least one UAV is flying in the area associated with the first location.

10. The system of claim 1, wherein the at least one device is further configured to:
    format the received first ID in accordance with requirements associated with a regulating agency.

11. The system of claim 10, wherein when formatting the received first ID, the at least one device is configured to anonymize data associated with the first UAV.

12. A method, comprising:
receiving a first identifier (ID) associated with a first unmanned aerial vehicle (UAV) prior to a flight;
storing the first ID;
receiving a second identifier from a first user device configured to control the first UAV;
authenticating the first user device;
receiving a command from the first user device associated with controlling operation of the first UAV; and
forwarding the command to the first UAV.

13. The method of claim 12, further comprising:
receiving, from the first user device, a request for telemetry data associated with the first UAV;
prioritizing command data over requests for telemetry data; and
forwarding command data to the first UAV prior to forwarding the request for telemetry data.

14. The method of claim 12, further comprising:
transmitting telemetry data associated with the flight of the first UAV to the first user device.

15. The method of claim 14, wherein the transmitting the telemetry data comprises:
providing a location, elevation and at least one of a heading or flight pattern for the first UAV.

16. The method of claim 12, further comprising:
receiving a request for telemetry data from a second user device; and
providing telemetry data associated with at least one UAV to the second user device.

17. The method of claim 12, further comprising:
formatting the received first ID in accordance with requirements associated with a regulating agency.

18. The method of claim 17, wherein formatting the received first ID comprises anonymizing data associated with the first UAV.

19. A non-transitory computer-readable medium having stored thereon sequences of instructions which, when executed by at least one processor, cause the at least one processor to:
receive a first identifier (ID) associated with a first unmanned aerial vehicle (UAV) prior to a flight;
store the first ID;
receive a second identifier from a first user device configured to control the first UAV;
authenticate the first user device;
receive a command from the first user device associated with controlling operation of the first UAV; and
forward the command to the first UAV.

20. The non-transitory computer-readable medium of claim 19, wherein the instructions further cause the at least one processor to:
receive, from the first user device, a request for telemetry data associated with the first UAV;
prioritize command data over requests for telemetry data; and
forward command data to the first UAV prior to forwarding the request for telemetry data.

* * * * *